United States Patent [19]
Jackson

[11] Patent Number: 5,603,583
[45] Date of Patent: Feb. 18, 1997

[54] TIE ROD ASSEMBLY FOR VEHICLE STEERING LINKAGES

[75] Inventor: Raymond Jackson, Ontario, Canada

[73] Assignee: TRW Inc., Lyndhurst, Ohio

[21] Appl. No.: 554,300

[22] Filed: Nov. 6, 1995

[51] Int. Cl.⁶ .................... F16B 7/06; B62D 7/16
[52] U.S. Cl. .............. 403/320; 403/46; 403/43; 280/95.1
[58] Field of Search ................ 403/43–48, 320; 280/95.1

[56] References Cited

U.S. PATENT DOCUMENTS

| | | | |
|---|---|---|---|
| 1,625,818 | 4/1927 | McArthur | 403/46 |
| 1,880,894 | 10/1932 | Dorman | 403/320 |
| 3,498,652 | 3/1970 | Cass | 403/43 |
| 4,890,949 | 1/1990 | Wood, Jr. | 403/77 |
| 5,004,367 | 4/1991 | Wood, Jr. | 403/46 |

FOREIGN PATENT DOCUMENTS 1344992 10/1987 U.S.S.R. .................... 403/43

Primary Examiner—Anthony Knight
Attorney, Agent, or Firm—Tarolli, Sundheim, Covell, Tummino & Szabo

[57] ABSTRACT

An adjustable tie rod assembly for a vehicle steering system (10) comprises first and second rod members (22, 24) having left hand and right hand threaded portions (30, 34), respectively. A tubular sleeve (20) includes first and second threaded portions (38, 40) for threadably receiving the threaded portions (30, 34) of the first and second rods (22, 24), respectively. A longitudinal slot (46) extends along the length of sleeve (20), but stops short of the distal ends (37, 39) of sleeve (20). The sleeve (20) further includes first and second radially aligned apertures (56, 58). A fastener means (26) extends through the apertures (56, 58) and, when tightened, applies compressive force on the engaged threads of the sleeve (20) and the rod members (22, 24) to restrict relative rotation of the rod members (22, 24) and the sleeve (20).

10 Claims, 2 Drawing Sheets

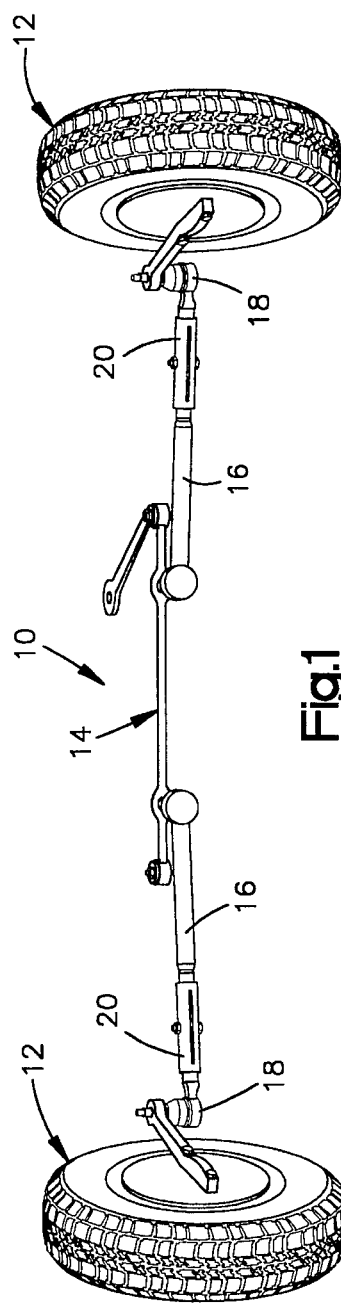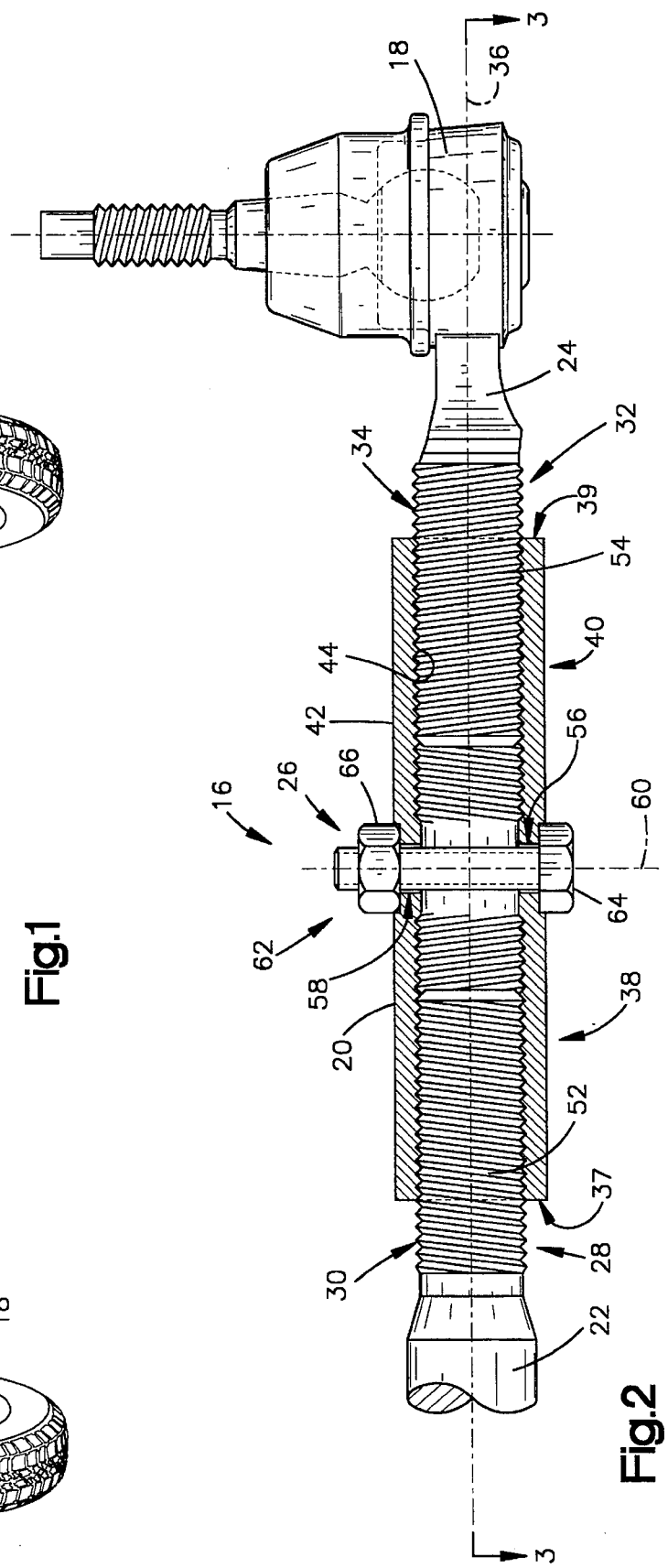

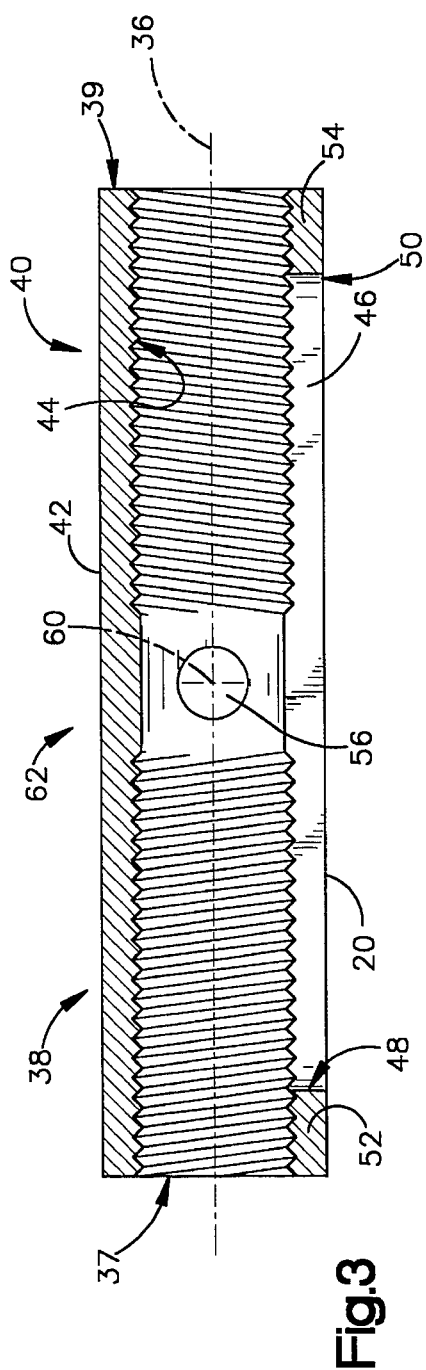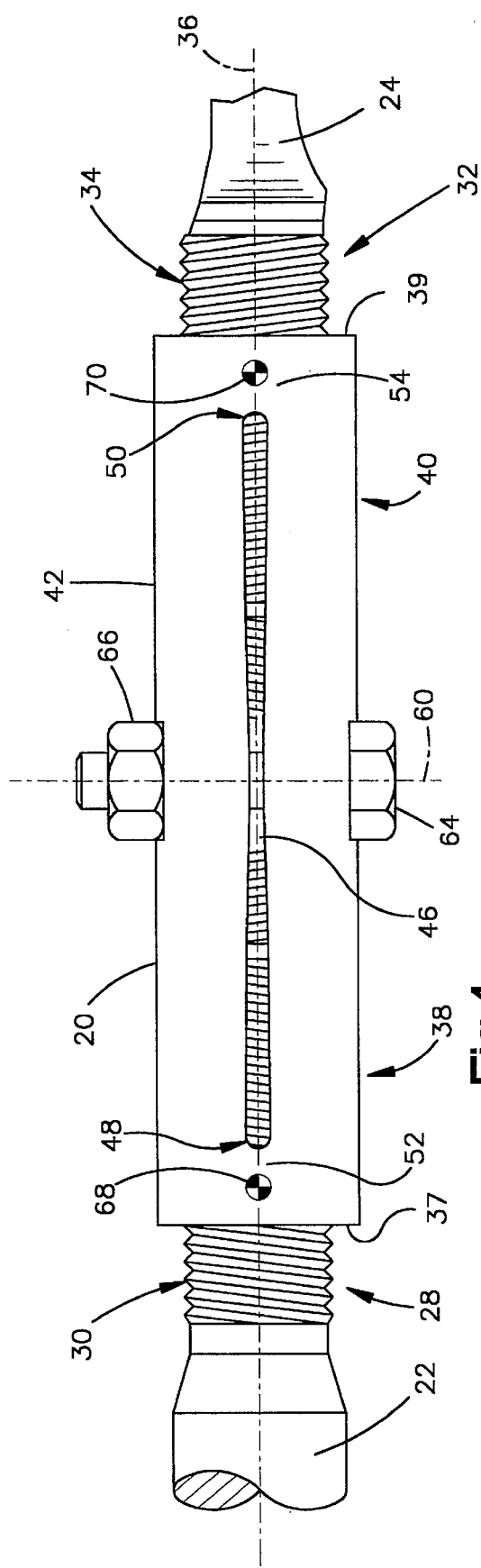

TIE ROD ASSEMBLY FOR VEHICLE STEERING LINKAGES

TECHNICAL BACKGROUND

The present invention is directed to an adjustable tie rod assembly for a vehicle steering linkage, and is particularly directed to an adjuster sleeve for use in a tie rod assembly.

BACKGROUND OF THE INVENTION

Conventional vehicle steering linkages, and some rack and pinion steering systems, utilize an adjuster sleeve to establish an adjustable connection between coaxial rod members. The adjuster sleeve comprises an internally threaded tubular sleeve which is located along an axis between two rod members having external threads. Each end of the sleeve threadably receives an associated rod member. One end of the sleeve and its associated rod member have left hand threads, while the other sleeve end and its associated rod member have right hand threads. As the sleeve is rotated, both rod members are threaded either into or out of the sleeve, depending on the direction of rotation, thereby increasing or decreasing the length of the sleeve and the rods. This adjustment capability is used to compensate for vehicle construction and tolerance variations in order to achieve optimum steering alignment at manufacture and during subsequent vehicle maintenance.

After the desired length of the sleeve and rods is achieved, a locking mechanism is used to block further relative rotation of the sleeve and rods. Typically, the locking mechanism includes means applied at each end of the sleeve to force the internal sleeve threads tightly against the external rod threads, thereby holding the sleeve and rods against relative rotation. One such means includes ring clamps tightened around the outside of the sleeve. A second such means includes jam nuts tightened axially against the distal ends of the sleeve.

Ring clamps are often used with tubular sleeves having seams, and with two-piece sleeves. The circumferential ring clamps keep sleeve seams and two-piece sleeves from being pulled apart by external forces. The ring clamps are free to rotate about the adjuster sleeve, requiring vehicle clearances to accommodate all possible clamp positions. At added cost and weight, ring clamps may be oriented by use of an index bar. An index bar is typically attached to one end of a rod and extends through a gap in a ring clamp, thus restricting rotational movement of the ring clamp.

Jam nuts offer an alternative to the ring clamp approach when vehicle clearances do not permit the use of ring clamps. Jam nuts are often used with one-piece sleeves. The jam nuts, which are threaded onto the rods, serve the same purpose as ring clamps, but do so in a different manner by applying axial forces instead of radial forces. Tightening of the jam nuts against the sleeves to a predetermined torque puts the rod and sleeve threads in tension, thereby restricting relative rotational movement of the sleeve and rods. A disadvantage to the jam nut approach is that external rotational forces on the tie rods can cause the jam nuts to loosen, resulting in premature tie rod failure. Another disadvantage to the use of jam nuts is that a special wrench may be needed to apply the necessary torque to the jam nuts.

SUMMARY OF THE INVENTION

In accordance with the present invention, a tie rod assembly comprises a first rod member including a first end portion having external left hand threads, and a second rod member including a first end portion having external right hand threads. A tubular sleeve having a sleeve axis includes a first threaded end portion for threadably receiving the first rod member and a second threaded end portion for threadably receiving the second rod member. A longitudinal slot in the sleeve extends parallel to the sleeve axis and has terminal ends terminating the slot short of the distal ends of the sleeve, and two radially aligned apertures extending through the sleeve. A fastener means is provided which extends through the two radially aligned apertures in the sleeve. The fastener means exerts compressive force on the threaded portions of the sleeve to restrict relative rotational movement of the sleeve and rod members.

Two circumferentially solid end regions of the sleeve are located between the terminal ends of the slot and the distal ends of the sleeve. The longitudinal slot provides elasticity to the sleeve and permits minor plastic deformation of the sleeve to occur during tightening of the fastener means. If relative rotation of the sleeve and a rod occurs, the sleeve still applies a torque to resist such relative rotation.

BRIEF DESCRIPTION OF THE DRAWINGS

Other features of the present invention will become apparent to those skilled in the art to which the present invention relates from reading the following specification with reference to the accompanying drawings, in which:

FIG. 1 is a schematic representation of a vehicle steering system including a tie rod assembly in accordance with the present invention;

FIG. 2 is a side view, taken partly in section, of portion of the tie rod assembly shown in FIG. 1;

FIG. 3 is a cross-sectional view taken along line 3—3 of the tie rod assembly shown in FIG. 2 with parts omitted; and FIG. 4 is a schematic representation of a feature of the present invention.

DESCRIPTION OF PREFERRED EMBODIMENT

Referring to FIG. 1, a vehicle steering system 10 comprises a pair of steerable wheels 12. The steerable wheels 12 are connected to a center link 14 through a pair of adjustable tie rod assemblies 16 and ball joint sockets 18. The ball joint sockets 18 are attached to the steerable wheels 12 in a manner well known in the art. Axial alignment of the steerable wheels 12 is accomplished by means of an adjustment sleeve 20 associated with the tie rod assemblies 16.

Referring now to FIGS. 2 and 3, a tie rod assembly 16, in accordance with a preferred embodiment of the invention, comprises adjustment sleeve 20, a first rod member 22, a second rod member 24, and a fastener means 26. The first rod member 22 has a first end portion 28 with a threaded outer surface 30. Similarly, the second rod member 24 has a first end portion 32 with a threaded outer surface 34. The threads of the first rod member 22 extend in a first or left hand direction. The threads of the second rod member 24 extend in an opposite or right hand direction.

The adjustment sleeve 20 is tubular in shape, and has an outer cylindrical surface 42, an inner cylindrical surface 44, and a sleeve axis 36. The sleeve 20 is one-piece and is preferably made of a carbon steel known in the art. The sleeve 20 includes a first distal end 37, a first end portion 38, a second distal end 39, and a second end portion 40 and a center portion 62. The inner surface 44 in the first end portion 38 of sleeve 28 has threads extending in a first or left hand direction. The inner surface 44 in the second end portion 40 of sleeve 20 has threads extending in an opposite or right hand direction. The inner surface 44 in the center portion 60 of sleeve 20 is unthreaded.

The sleeve 20 further includes a longitudinal slot 46, as shown in FIGS. 3 and 4, extending parallel to the sleeve axis and spanning across the first, center and second portions 38, 62 and 40 respectively, of sleeve 20. The slot 46 has terminal ends 48 and 50 which terminate the slot 46 short of the distal ends 37 and 39, respectively. The slot 46 is centered between the distal ends 37, 39 of the sleeve 20 thereby forming two substantially similar and circumferentially continuous solid end regions 52 and 54 in the first and second end portions 38 and 40, respectively, of the sleeve 20. The solid end regions 52 and 54 are preferably no shorter in total length than about one tenth of the overall longitudinal length of the sleeve 20.

The sleeve 20 also has a first radial aperture 56 and a second radial aperture 58 which are radially aligned with one another in the center portion 62 of the sleeve 20. The first and second radial apertures 56 and 58 are aligned along a radial centerline 60 of the sleeve 20 which is perpendicular to and intersects the sleeve axis 36. From the intersection of the sleeve axis 36 and the radial centerline 60, the slot 46 is preferably located 90° from the first and second radial apertures 56 and 58 which are 180° apart.

The fastener means 26, in accordance with the embodiment shown in FIG. 2, includes a bolt 64 which extends through apertures 56 and 58 in the sleeve 20, and a nut 66 for receiving the bolt 64.

In operation, the threaded outer surface 30 of the first rod member 22 is received by the threaded first end portion 38 of the sleeve 20. Similarly, the threaded outer surface 34 of the second rod member 24 is received by the threaded inner surface portion 40 of the sleeve 20. With the threads on the first end portion 38 being left-handed and the threads on the second end portion 40 being opposite or right handed, the overall length of the rod assembly 16 is readily changed by rotation of the sleeve 20. Rotation of the sleeve 20 in one direction simultaneously threads both first and second tie rod members 22 and 24 further into the sleeve 20, thereby shortening the overall length of the tie rod assembly 16. Rotation of the sleeve 20 in an opposite direction simultaneously threads both first and second tie rod members 22 and 24 further out of the sleeve 20, thereby extending the overall length of the tie rod assembly 16. By using the sleeve 20 to shorten or extend the length of the tie rod assembly 16, alignment of the steerable wheels 12 may be accomplished.

Once the tie rod assembly 15 has been adjusted to a desired length for alignment, this length is preserved by tightening the nut 66 on the bolt 64. By tightening the nut 66, a radial compressive force is exerted on the end portions 38 and 40 of the sleeve 20 which are in threaded engagement with the first and second rod members 22 and 24, respectively. The sleeve end portions 38 and 40 tightly clamp against the first and second rod members 22 and 24. The sleeve 20 thus restricts further relative rotational movement of the sleeve 20 and rod members 22 and 24. When the nut 64 is being tightened, the first and second solid end regions 52 and 54 of the sleeve 20 also serve as fulcrums as schematically shown in FIG. 4. The solid end regions 52 and 54 function as fulcrums by providing leverage to the fastener means 26 during compression of the sleeve 20, as schematically represented by fulcrum centerpoints 68 and 70. The slot 46 in the sleeve 20 permits minor plastic deformation of the sleeve 20 to occur, as schematically depicted in FIG. 4, during compression by the fastener means 26. If relative rotation of the sleeve 20 and a rod member 22 and/or 24 should occur, the sleeve will continue to apply a force to the rod member to resist relative rotation.

From the above description of the invention, those skilled in the art will perceive improvements, changes and modifications. For example, the sleeve 20 may include a second longitudinal slot circumferentially disposed opposite slot 46. Such improvements, changes and modifications within the skill of the art are intended to be covered by the appended claims.

Having described the invention, the following is claimed:

1. An adjustable tie rod assembly for a vehicle steering linkage comprising:
    a first rod member including a first end portion having external left hand threads;
    a second rod member including a first end portion having external right hand threads;
    a tubular sleeve having a sleeve axis, said sleeve including a first threaded end portion for threadedly receiving said first end portion of said first rod member, a second threaded end portion for threadedly receiving said first end portion of said second rod member, a longitudinal slot extending parallel to said sleeve axis and having terminal ends terminating said slot short of the distal ends of said sleeve, and a first and second radially aligned apertures extending through said sleeve;
    a fastener means extending through said radially aligned apertures for exerting compressive force on said threaded portions of said sleeve thereby restricting rotational movement of said sleeve.

2. The apparatus as defined in claim 1 wherein said first and second radially aligned apertures extend perpendicular to said sleeve axis through a center portion of said sleeve.

3. The apparatus as defined in claim 1 wherein said fastener means includes a bolt extending through said first and second aligned apertures in said sleeve and a nut for receiving said bolt.

4. The apparatus as defined in claim 1 wherein rotation of said sleeve in one direction threads both said first and second tie rod members further into said sleeve to thereby shorten the length of said tie rod assembly, and rotation of said sleeve in an opposite direction threads both said first and second tie rod members further out of said sleeve to thereby extend the length of said tie rod assembly.

5. The apparatus as defined in claim 1 wherein said longitudinal slot permits plastic deformation of said sleeve during compression by said fastener means.

6. The apparatus as defined in claim 1 wherein said sleeve is a one-piece cylindrical tube member.

7. The apparatus as defined in claim 1 wherein said longitudinal slot is located circumferentially between said two radially aligned apertures.

8. The apparatus as defined in claim 1 wherein said longitudinal slot is centered about the length of said sleeve forming tow circumferentially solid end regions of said sleeve between said terminal ends of said slot and said distal ends of said sleeve.

9. The apparatus as defined in claim 8 wherein said two solid end regions of said sleeve are no shorter in total length than about one tenth of the overall length of said sleeve.

10. An apparatus for use in an adjustable tie rod assembly having a first and second tie rod members, said apparatus comprising:
    a sleeve means including a first end portion having left hand threads for threadably receiving the first tie rod member, a second end portion having right hand threads for threadably receiving the second tie rod member, and a center portion having first and second radially aligned apertures; and
    a fastener means extending through said radially aligned apertures in said sleeve means;
    said sleeve means further including a longitudinal slot having terminal ends terminating said slot short of the distal ends of said sleeve means.

* * * * *